(12) United States Patent  (10) Patent No.: US 9,155,051 B2
Sarkar et al.  (45) Date of Patent: Oct. 6, 2015

(54) DYNAMIC CONGESTION CONTROL FOR POWER-BLOCKING SECTORS IN A RADIO TELECOMMUNICATION NETWORK

(75) Inventors: Debasish Sarkar, Gurgaon (IN); Ayan Sen, Gurgaon (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 881 days.

(21) Appl. No.: 13/285,791

(22) Filed: Oct. 31, 2011

(65) Prior Publication Data

US 2013/0107701 A1  May 2, 2013

(51) Int. Cl.
*H04L 12/28* (2006.01)
*H04W 52/14* (2009.01)
*H04L 12/24* (2006.01)
*H04W 28/02* (2009.01)
*H04W 52/20* (2009.01)
*H04W 52/34* (2009.01)
*H04J 1/16* (2006.01)
*H04L 12/851* (2013.01)

(52) U.S. Cl.
CPC ......... *H04W 52/143* (2013.01); *H04L 41/0836* (2013.01); *H04W 28/0289* (2013.01); *H04W 52/20* (2013.01); *H04W 52/343* (2013.01); *H04L 47/24* (2013.01); *Y02B 60/50* (2013.01)

(58) Field of Classification Search
USPC .......................................... 370/229, 252, 329
See application file for complete search history.

(56) References Cited

U.S. PATENT DOCUMENTS 7,532,892 B2 * 5/2009 Hoglund et al. ............ 455/452.2
2010/0172279 A1 * 7/2010 Chen et al. ..................... 370/312

* cited by examiner

*Primary Examiner* — John Pezzlo

(57) ABSTRACT

A method and congestion controller for controlling congestion in a sector of a cellular telecommunication network that is limited by available downlink transmit power. The network includes a plurality of radio links between a radio base station and User Equipments (UEs) operating in the sector. The controller may first reduce the power of a first subset of the radio links by reducing the packet-switched (PS) downlink target Block Error Rate (BLER) Quality. If the congestion is not resolved within a defined time period, the power of a second subset of the radio links may be reduced by reducing the circuit-switched (CS) DL target BLER Quality. If reducing the PS and CS downlink target BLER Quality does not resolve the congestion, the invention may then implement an existing method of releasing non-guaranteed Air Interface Speech Equivalents (ASEs) and then guaranteed ASEs if required.

15 Claims, 4 Drawing Sheets

DYNAMIC CONGESTION CONTROL FOR POWER-BLOCKING SECTORS IN A RADIO TELECOMMUNICATION NETWORK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to radio telecommunication systems. More particularly, and not by way of limitation, the present invention is directed to a method and a congestion controller for controlling congestion in a sector of a cellular telecommunication network that is limited by available downlink transmit power.

When excessive traffic in a cellular telecommunication network results in congestion control, the downlink (DL) data rate may be reduced to a lowest retainable rate in an attempt to reduce the congestion level below a stipulated threshold level. If this is not successful, some of the existing calls may be preempted based on their relative priorities and service types. In the current implementation, when congestion is detected, certain non-guaranteed traffic class connections referred to as Air Interface Speech Equivalents (ASEs) are released at periodic intervals followed by Guaranteed ASEs until the congestion is resolved. In an ASE, normally different services like video calls, High Speed Downlink Packet Access (HSDPA) calls, and the like are converted to one unique service like a speech call. This process typically results in a certain number of non-guaranteed as well as guaranteed calls being released, which may not create a good customer experience.

FIG. 1 is a graph of downlink transmit carrier power as a function of time when implementing an existing method of congestion control in a cellular telecommunication network. A first time period (tmInitialG) 11 is the minimum time period after detection of downlink (DL) cell congestion before congestion resolution actions are initiated on guaranteed ASEs in a cell. Only non-guaranteed ASEs are released during the tmInitialG time period. The tmInitialG period may vary between 10 msec to 100,000 msec (100 seconds). A default setting of 3,000 msec (3 seconds) is a reference case setting. The actual setting can deviate from the default setting depending on the required speed to resolve the DL cell congestion situation and the characteristics of the non-guaranteed traffic class services in the network.

A second time period (tmCongActionNg) 12 is the interval between periodic congestion resolution actions on the non-guaranteed ASEs in a cell. The tmCongActionNg period may vary between 500 msec to 100,000 msec (100 seconds). A default setting of 800 msec is a reference case setting. The actual setting can deviate from the default setting depending on the required speed to resolve the DL cell congestion situation and the characteristics of the non-guaranteed traffic class services in the network.

A first parameter (releaseAseDINg) 13 is the number of non-guaranteed ASEs in the DL to be released with each periodic congestion resolution action targeting non-guaranteed ASEs in a cell. The releaseAseDINg parameter may vary between 0 and 500 ASEs. A default setting of 3 ASEs is a reference case setting. The actual setting can deviate from the default setting depending on the required speed to resolve the DL cell congestion situation and the characteristics of the non-guaranteed traffic class services in the network.

Following the expiration of the tmInitialG time period 11, the process may release guaranteed ASEs. A second parameter (releaseAseDI) 14 is the number of guaranteed ASEs in the DL to be released with each periodic congestion resolution action targeting guaranteed ASEs in a cell. The releaseAseDI parameter may vary between 0 and 500 ASEs. A default setting of 1 ASE is a reference case setting. The actual setting can deviate from the default setting depending on the required speed to resolve the DL cell congestion situation and the characteristics of the guaranteed traffic class services in the network.

A third time period (tmCongAction) 15 is the interval between periodic congestion resolution actions on the guaranteed ASEs in a cell. The tmCongAction period may vary between 300 msec to 100,000 msec (100 seconds). A default setting of 2,000 msec (2 seconds) is a reference case setting. The actual setting can deviate from the default setting depending on the required speed to resolve the DL cell congestion situation and the characteristics of the guaranteed traffic class services in the network.

As can be seen, both non-guaranteed and guaranteed services are released in order of priority by releasing ASEs periodically to resolve congestion.

SUMMARY

With the existing implementation, if rate reduction to the lowest retainable rate does not suffice to resolve the congestion level below the stipulated threshold level, non-guaranteed and finally guaranteed ASEs are released in predefined steps. This effectively results in forcible closure of user connections and may not create a good user perception in case of a highly loaded cell.

The present invention provides a solution to the above-mentioned problems. In embodiments of the present invention, congestion is resolved by dynamically modifying the downlink target Block Error Rate (BLER) Quality. Instead of pre-empting a Radio Access Bearer (RAB), if congestive blocking is due to downlink (DL) power unavailability, an embodiment of the invention reduces the power required by the existing radio links by dynamically reducing the DL target BLER Quality.

In one embodiment, the invention may first reduce the power of a first subset of the radio links by reducing the packet-switched (PS) DL target BLER Quality. If the congestion is not resolved, the power of a second subset of the radio links may be reduced by reducing the circuit-switched (CS) DL target BLER Quality. This order (PS first and then CS) may be preferred by operators because CS services are real-time services such as voice calls, which are quality sensitive. Hence, operators may prefer to degrade the non-real time services such as PS calls first. However, in an alternative embodiment, the invention may reduce the CS DL target BLER Quality first and then reduce the PS DL target BLER Quality if needed.

In another embodiment, the invention may reduce the DL target BLER Quality for all of the radio links without regard to whether they are PS or CS links.

In any of these embodiments, if reducing the DL target BLER Quality does not resolve the congestion, the invention may then implement the existing method of releasing non-guaranteed ASEs and guaranteed ASEs if required.

In one embodiment, the present invention is directed to a method of controlling congestion in a sector of a cellular telecommunication network having a plurality of radio links between a radio base station and User Equipments (UEs) operating in the sector. The method includes the steps of detecting by a congestion controller, that congestion exists in the sector when a current level of downlink transmit power being utilized in the sector exceeds a threshold level; and in response to detecting the congestion, reducing by the congestion controller, a downlink (DL) target Block Error Rate (BLER) Quality for a first subset of the radio links. Reducing the DL target BLER Quality reduces the downlink transmit power of the first subset of the plurality of radio links.

The congestion controller may reduce the DL target BLER Quality for the first subset of the radio links for a first reduction time period, and the method may also include the steps of determining by the congestion controller, whether congestion still exists in the sector when the first reduction time period expires; and upon determining that congestion still exists in the sector, reducing by the congestion controller, a DL target BLER Quality for a second subset of the radio links for a second reduction time period. Reducing the DL target BLER Quality for the second subset reduces the downlink transmit power of the second subset of the plurality of radio links.

In another embodiment, the present invention is directed to a congestion controller for controlling congestion in a sector of a cellular telecommunication network having a plurality of radio links between a radio base station and UEs operating in the sector. The congestion controller includes a processor coupled to a non-transitory memory, wherein when the processor executes computer program instructions stored on the memory, the processor causes the congestion controller to detect that congestion exists in the sector when a current level of downlink transmit power being utilized in the sector exceeds a threshold level; and in response to detecting the congestion, reduce a DL target BLER Quality for the plurality of radio links. Reducing the DL target BLER Quality reduces the downlink transmit power of the plurality of radio links.

In another embodiment, the invention is directed to a congestion controller for controlling congestion in a sector of a cellular telecommunication network having a plurality of radio links between a radio base station and UEs operating in the sector. The congestion controller includes a processor coupled to a non-transitory memory, wherein when the processor executes computer program instructions stored on the memory, the processor causes the congestion controller to detect that congestion exists in the sector when a current level of downlink transmit power being utilized in the sector exceeds a threshold level; and in response to detecting the congestion, reduce a DL target BLER Quality for a first subset of the plurality of radio links. Reducing the DL target BLER Quality reduces the downlink transmit power of the first subset of radio links.

The congestion controller may be configured to reduce the DL target BLER Quality for the first subset of the radio links for a first reduction time period, and the congestion controller may be further configured to determine whether congestion still exists in the sector when the first reduction time period expires; and reduce a DL target BLER Quality for a second subset of the radio links for a second reduction time period, upon determining that congestion still exists in the sector. Reducing the DL target BLER Quality for the second subset reduces the downlink transmit power of the second subset of the plurality of radio links.

The present invention provides a better chance to retain existing calls without the need for releasing them for congestion handling. This in turn can improve the overall customer perception as well as reduce the call drop rate due to system-generated causes.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that the invention may be implemented in hardware or in a combination of hardware and software in which a processor executes computer program instructions stored on a non-transitory memory.

Figure 1:
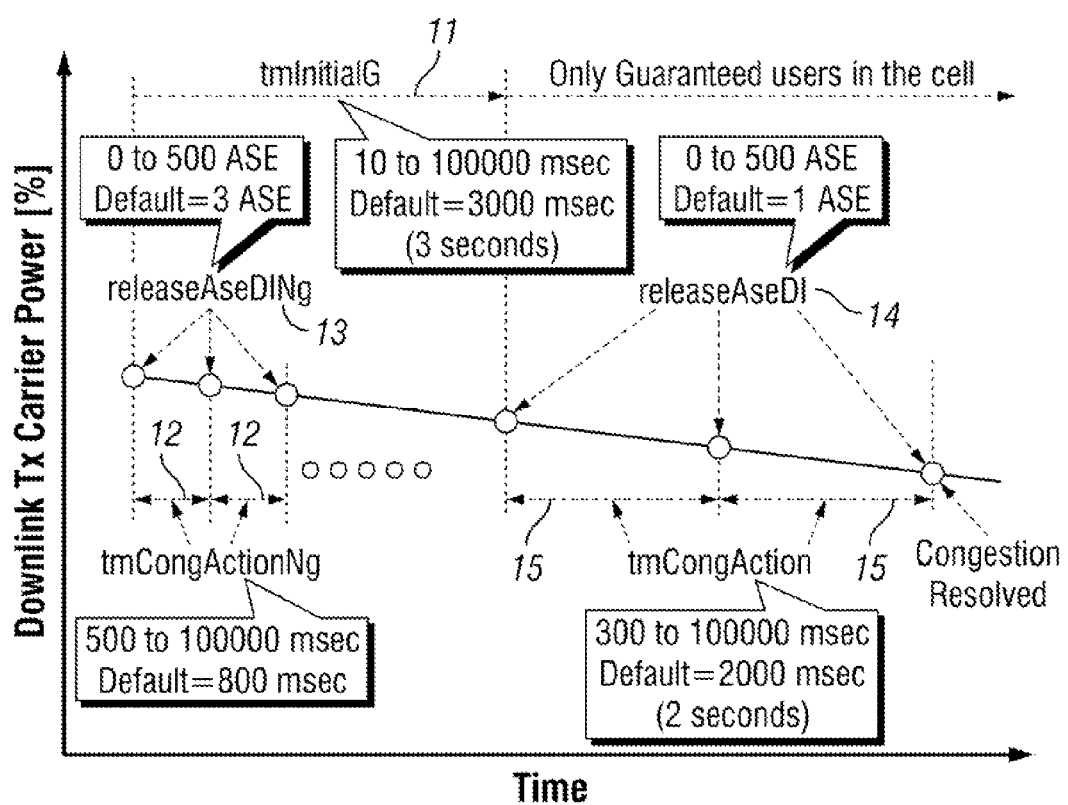
FIG. 1 (Prior Art) is a graph of downlink transmit carrier power as a function of time when implementing an existing method of congestion control in a cellular telecommunication network.
Figure 2:
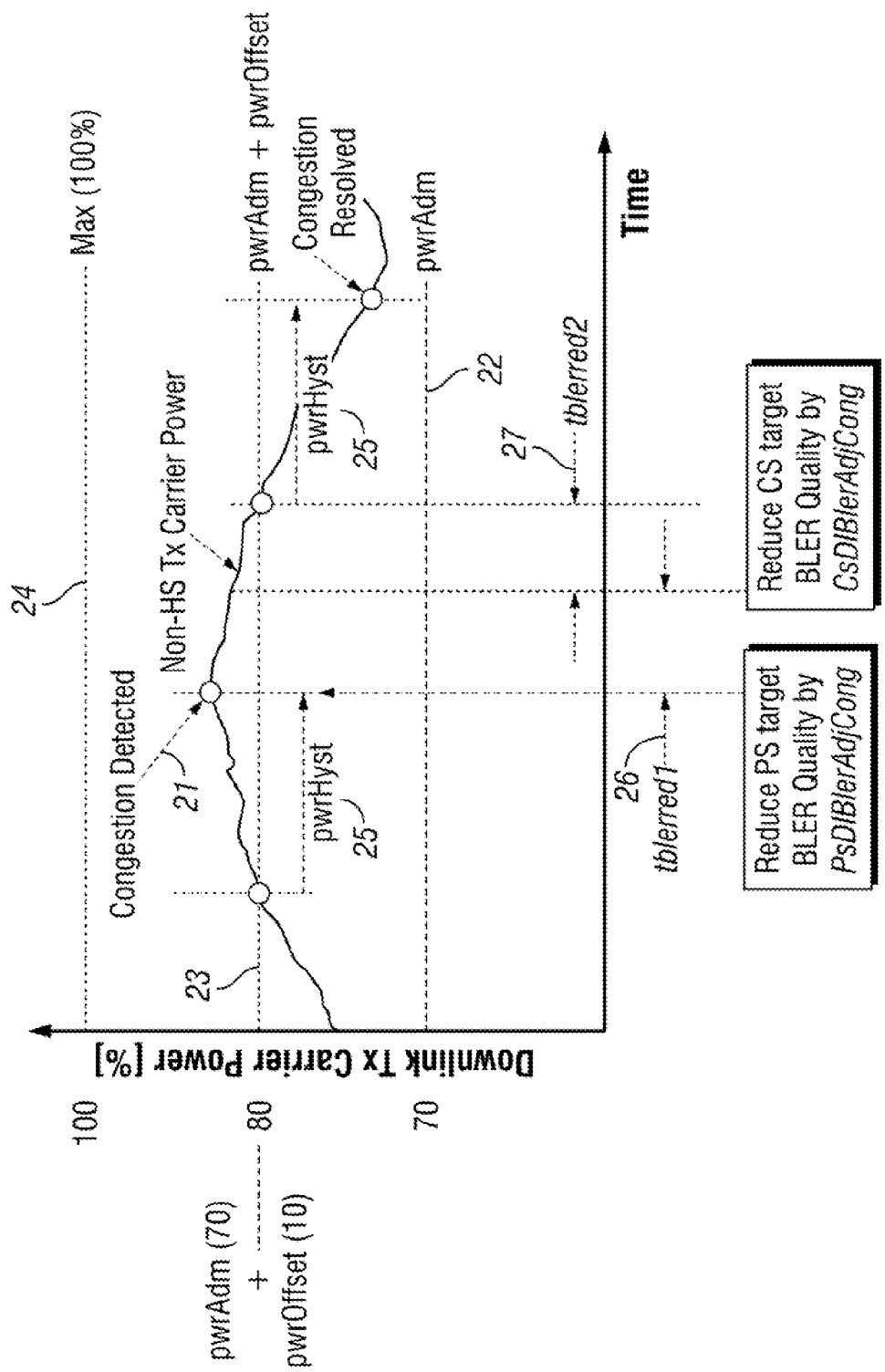
FIG. 2 is a graph of downlink transmit carrier power as a function of time when implementing an exemplary embodiment of the method of the present invention.

FIG. 2 is a graph of downlink transmit carrier power as a function of time when implementing an exemplary embodiment of the method of the present invention. The illustrated method may be performed as a primary measure in case of congestion detection and before proceeding with the existing method of congestion resolution handling as shown in FIG. 1. FIG. 2 illustrates an example of Non-HSPDA transmit (Non-HS Tx) carrier power 21 as it varies over time and passes various power and timing threshold levels.

The dashed horizontal line labeled "pwrAdm" 22 represents an admission limit for DL transmission carrier power, above which the base station will not accept new calls. The dashed horizontal line labeled "pwrAdm+pwrOffset" 23 is used as a threshold for congestion detection and control. The pwrAdm+pwrOffset transmit power level is higher than the pwrAdm power level by a pwrOffset amount, and is lower than the maximum (100%) DL transmit carrier power represented by the solid horizontal line 24. FIG. 2 illustrates exemplary values of 70% for pwrAdm, 10% for pwrOffset, and 80% for the pwrAdm+pwrOffset congestion-detection threshold level. The invention, of course, is not limited to these values as they are exemplary only.

A time period labeled "pwrHyst" 25 is a hysteresis time setting for detection of congestion in the DL transmit carrier power. The measured DL transmit carrier power must be above the congestion-detection threshold level (pwrAdm+ pwrOffset) for more than the pwrHyst time before the situation is detected as DL cell congestion. In the same way, DL cell congestion is considered to be resolved when the measured DL transmit carrier power is below the congestion-detection threshold level (pwrAdm+pwrOffset) for more than the pwrHyst time. A default setting for pwrHyst (for example, 300 msec) is provided to avoid false DL cell congestion detection. The actual setting can deviate from the default depending on the duration of peaks in DL transmitted carrier power influenced by UE behavior and power control settings that cause false DL cell congestion detection.

When congestion is detected, a congestion controller may reduce the downlink transmit power of a first subset of the plurality of radio links in the sector by reducing the DL target BLER Quality for packet-switched (PS) User Equipment/Radio Access Bearer Combinations (UeRCs), including non-CS Multi-RAB combinations such as the combination of streaming PS (16 kbps/64 kbps) and Interactive PS (8 kbps/8 kbps). The PS DL target BLER Quality may be reduced by a new factor referred to as PsDIBlerAdjCong (for example 0.1%) for a first time period labeled thlerred1 26. A default setting for thlerred1 of 100 msec is provided, but may be adjusted by the operator to provide more or less time for the PS DL target BLER Quality reduction to take effect. If congestion is resolved before the first thlerred1 time period expires, the congestion controller may restore the PS DL target BLER Quality to a level specified by blerQualityTargetDI for a particular DL target BLER Quality level.

If congestion is not resolved before the first thlerred1 time period expires, the congestion controller may also reduce the downlink transmit power of a second subset of the plurality of radio links in the sector by reducing the downlink CS target BLER Quality for CS Speech 12.2 RABs by an amount referred to as CsDIBlerAdjCong (for example 0.1%) for a second thlerred2 time period 27 (for example 100 msec). If congestion is resolved before the second thlerred2 time period expires, the DL transmission controller may restore both the PS DL target BLER Quality and the CS DL target BLER Quality to levels specified by blerQualityTargetDI for a particular DL target BLER Quality level.

If congestion is still not resolved (i.e., the measured DL transmit carrier power utilization is still above the pwrAdm+pwrOffset congestion-detection threshold) upon expiration of the second tblerred2 time period (and the pwrHyst time if required), the congestion controller may proceed with the existing congestion resolution procedure as shown in FIG. 1 above.

Figure 3:
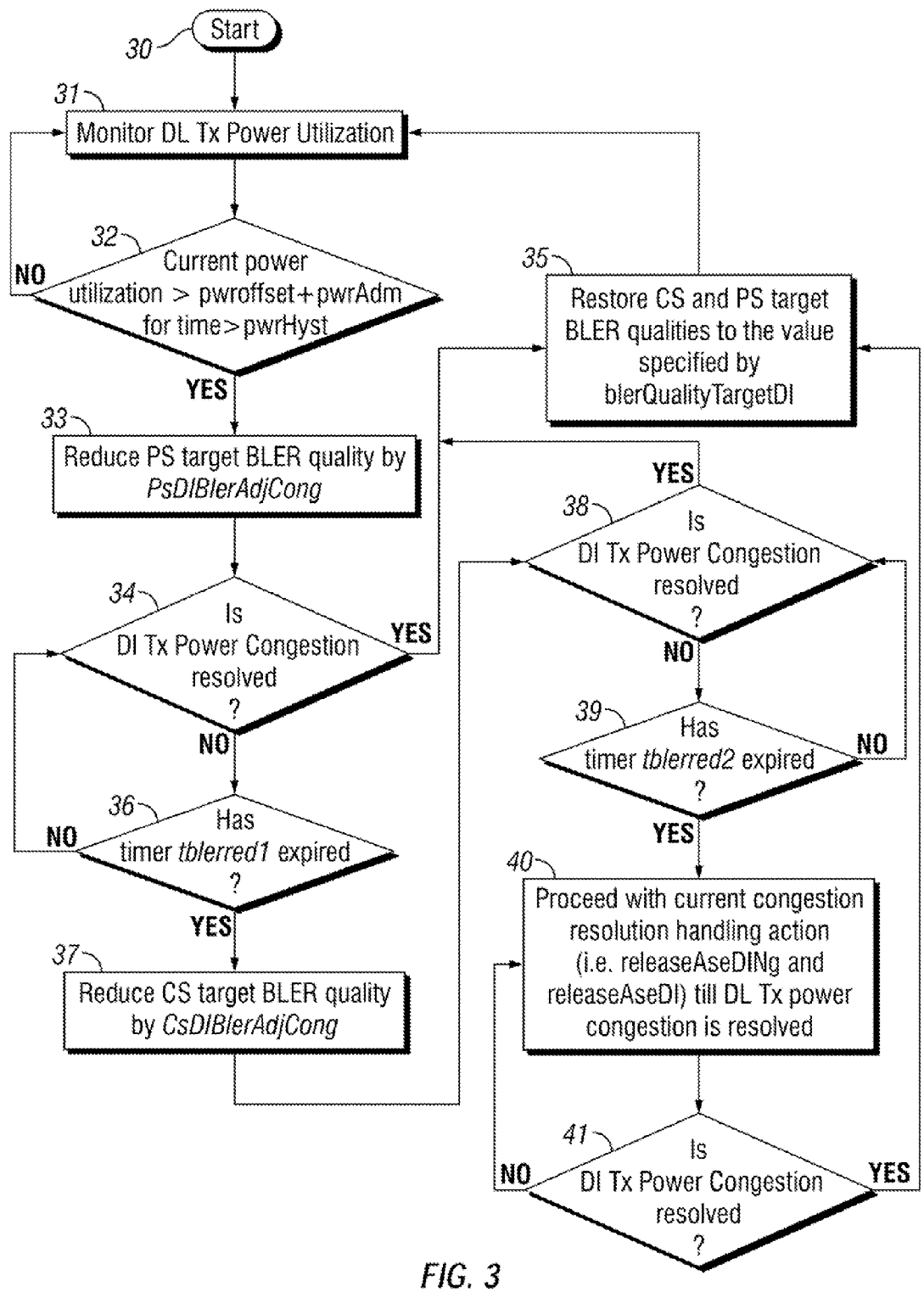
FIG. 3 is a flow chart of an exemplary embodiment of the method of the present invention.

FIG. 3 is a flow chart of an exemplary embodiment of the method of the present invention. The method starts at step 30 and proceeds to step 31 where the congestion controller monitors periodic reports of DL transmit power utilization. At step 32, the controller determines whether the current DL transmit power utilization is greater than the pwrAdm+pwrOffset congestion-detection threshold for a time period greater than the pwrHyst time period. If not, congestion is not detected, and the method returns to step 31 and continues to monitor the periodic reports of DL transmit power utilization.

However, if the current DL transmit power utilization is greater than the pwrAdm+pwrOffset congestion-detection threshold for a time period greater than the pwrHyst time period, DL transmit power congestion is detected and the method moves to step 33 where the congestion controller reduces the PS DL target BLER Quality by PsDIBlerAdjCong. At step 34, the controller determines whether the DL transmit power congestion has been resolved. If so, the method moves to step 35 where the congestion controller restores the PS target BLER Quality to the value specified by blerQualityTargetDI for the corresponding UeRCs. The method then returns to step 31 where the congestion controller continues to monitor periodic reports of DL transmit power utilization.

However, if the DL transmit power congestion has not been resolved, the method moves to step 36 where the congestion controller determines whether the thlerred1 timer has expired. If not, the method returns to step 34 where the congestion controller continues to analyze whether the DL transmit power congestion has been resolved during the thlerred1 time period. If the thlerred1 timer expires and the DL transmit power congestion has not been resolved, the method moves to step 37 where the congestion controller reduces the CS DL target BLER Quality by CsDIBlerAdjCong. At step 38, the controller determines whether the DL transmit power congestion has been resolved. If so, the method moves to step 35 where the congestion controller restores both the PS and the CS target BLER qualities to the value specified by blerQualityTargetDI for the corresponding PS UeRCs and CS speech RABs. The method then returns to step 31 where the congestion controller continues to monitor periodic reports of DL transmit power utilization.

However, if the DL transmit power congestion has not been resolved, the method moves to step 39 where the congestion controller determines whether the thlerred2 timer has expired. If not, the method returns to step 38 where the congestion controller continues to analyze whether the DL transmit power congestion has been resolved during the thlerred2 time period. If the thlerred2 timer expires and the DL transmit power congestion has not been resolved, the method moves to step 40 where the congestion controller may proceed with the existing congestion-resolution process and begin releasing non-guaranteed ASEs as shown in FIG. 1. At step 41, the controller determines whether the DL transmit power congestion has been resolved. If so, the method moves to step 35 where the congestion controller restores both the PS and the CS DL target BLER qualities to the value specified by blerQualityTargetDI for the corresponding PS UeRCs and CS speech RABs. The method then returns to step 31 where the congestion controller continues to monitor periodic reports of DL transmit power utilization.

However, if the DL transmit power congestion has not been resolved, the method returns to step 40 where the congestion controller continues the existing congestion-resolution process by releasing guaranteed ASEs as shown in FIG. 1. This process continues until it is determined at step 41 that the DL transmit power congestion has been resolved.

Figure 4:
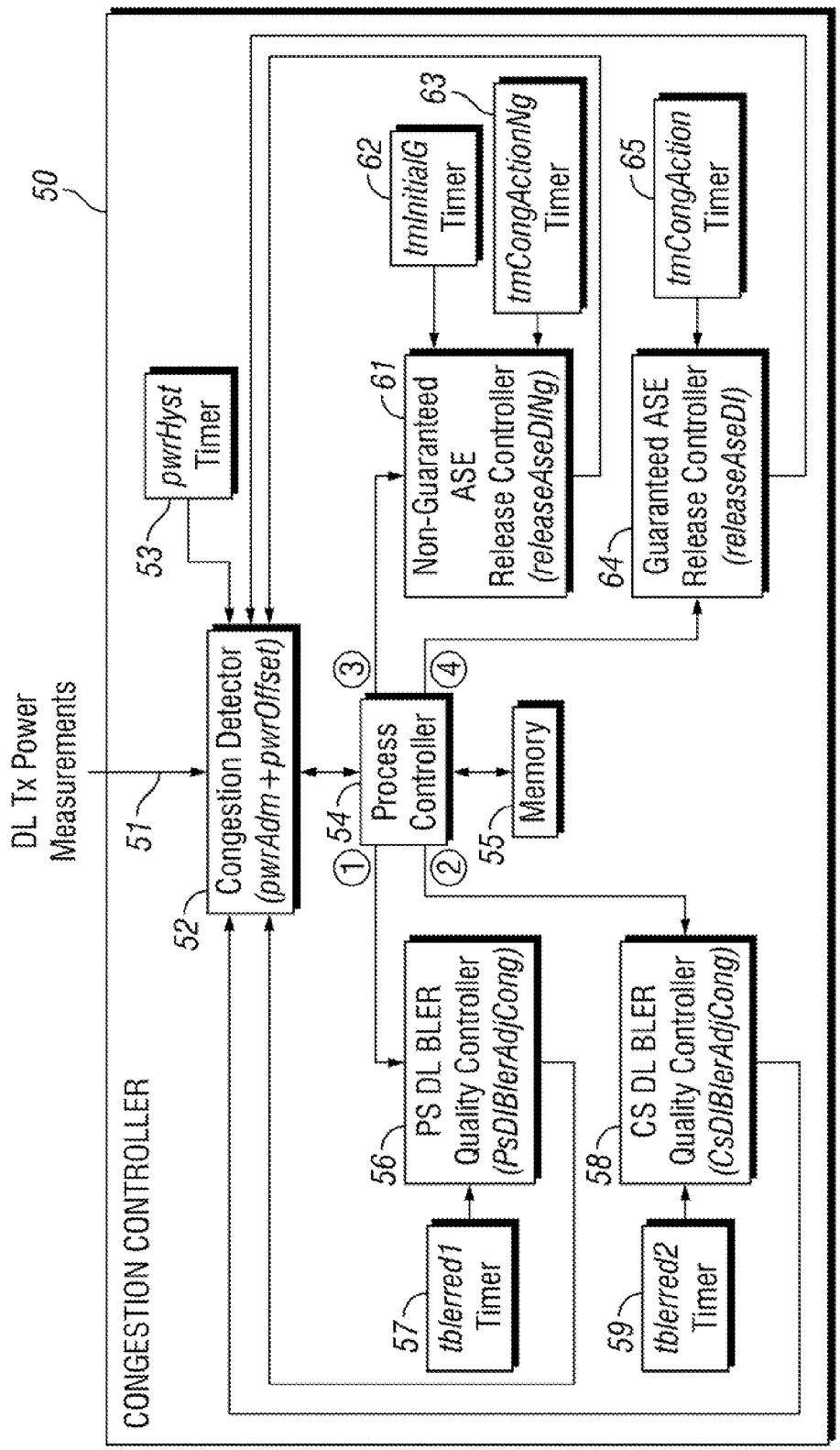
FIG. 4 is a simplified block diagram of an exemplary embodiment of the congestion controller of the present invention.

FIG. 4 is a simplified block diagram of an exemplary embodiment of the congestion controller 50 of the present invention. In various embodiments, the congestion controller may be implemented, for example, in a radio base station, a base station controller, or other node in a radio access network. Periodic DL transmit power measurements 51 are received in a congestion detector 52. The congestion detector detects congestion when the DL transmit power measurements are above the pwrAdm+pwrOffset threshold level for more than the pwrHyst time period input by a pwrHyst timer 53. When congestion is detected, the congestion detector notifies a process controller 54. The process controller may be, for example, a processor executing computer program instructions stored on a non-transitory memory 55.

The process controller 54 first tries to resolve the congestion by activating a PS DL BLER Quality controller 56, which reduces the PS DL target BLER Quality by PsDIBlerAdjCong for the time period thlerred1 as input by a thlerred1 timer 57. The congestion detector 52 continues to monitor the DL transmit power measurements and if the congestion has been resolved, the process controller instructs the PS DL BLER Quality controller to restore the PS DL target BLER Quality to a level specified by blerQualityTargetDI for a particular DL target BLER Quality level for the concerned UeRCs.

However, if the congestion has not been resolved, the process controller activates a CS DL BLER Quality controller 58, which reduces the CS DL target BLER Quality by CsDIBlerAdjCong for the time period thIerred2 as input by a thIerred2 timer 59. The congestion detector 52 continues to monitor the DL transmit power measurements and if the congestion has been resolved, the process controller 54 instructs the PS DL BLER Quality controller and the CS DL BLER Quality controller to restore both the PS DL target BLER Quality and the CS DL target BLER Quality to a level specified by blerQualityTargetDI for a particular DL target BLER Quality level for the concerned PS UeRCs and CS speech RABs.

However, if the congestion has not been resolved, the process controller activates a non-guaranteed ASE release controller 61 to release a number of non-guaranteed ASEs as specified by releaseAseDINg. This is done during the time period tmInitialG as input by the tmInitialG timer 62. A tmCongActionNg timer 63 provides the interval between periodic congestion resolution actions on the non-guaranteed ASEs in the cell. The congestion detector 52 continues to monitor the DL transmit power measurements and if the congestion has been resolved, the process controller 54 instructs the PS BLER Quality controller 56 and the CS BLER Quality controller 58 to restore both the PS target BLER Quality and the CS target BLER Quality to a level specified by blerQualityTargetDI for a particular DL target BLER Quality level.

However, if the congestion has not been resolved within time tmInitialG, the process controller activates a guaranteed ASE release controller 64 to release a number of guaranteed ASEs as specified by releaseAseDI. A tmCongAction timer 65 provides the interval between periodic congestion resolution actions on the guaranteed ASEs in the cell. The congestion detector 52 continues to monitor the DL transmit power measurements and if the congestion has been resolved, the process controller 54 instructs the PS BLER Quality controller 56 and the CS BLER Quality controller 58 to restore both the PS target BLER Quality and the CS target BLER Quality to a level specified by blerQualityTargetDI for a particular DL target BLER Quality level for the concerned PS UeRCs and CS speech RABs.

In the above manner, embodiments of the present invention resolve congestion in a sequence of stages that first reduce the PS target BLER Quality; if unsuccessful, then also reduce the CS target BLER Quality; if unsuccessful then also release non-guaranteed ASEs; and finally, if unsuccessful then also release guaranteed ASEs.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of controlling congestion in a sector of a cellular telecommunication network having a plurality of radio links between a radio base station and User Equipments (UEs) operating in the sector, the method comprising the steps of:

detecting by a congestion controller, that congestion exists in the sector when a current level of downlink transmit power being utilized in the sector exceeds a threshold level; and in response to detecting the congestion, reducing by the congestion controller, a downlink (DL) target Block Error Rate (BLER) Quality for a first subset of the radio links, wherein the congestion controller reduces the DL target BLER Quality for the first subset of the radio links for a first reduction time period;

wherein reducing the DL target BLER Quality reduces the downlink transmit power of the first subset of the plurality of radio links;

determining by the congestion controller, whether congestion still exists in the sector when the first reduction time period expires; and upon determining that congestion still exists in the sector, reducing by the congestion controller, a DL target BLER Quality for a second subset of the radio links for a second reduction time period;

wherein reducing the DL target BLER Quality for the second subset reduces the downlink transmit power of the second subset of the plurality of radio links.

2. The method as recited in claim 1, wherein the detecting step includes detecting that the current level of downlink transmit power exceeds the threshold level for more than a hysteresis period of time.

3. The method as recited in claim 1, wherein the threshold level is a downlink transmit power level equal to the sum of an admission power level plus an offset power amount, wherein the admission power level is the downlink power level above which the base station will not accept new calls, and the sum of the admission power level and the offset power amount is less than the maximum downlink power available.

4. The method as recited in claim 1, wherein the step of reducing the DL target BLER Quality for the first subset of radio links includes reducing by the congestion controller, a packet-switched (PS) DL target BLER Quality;

wherein reducing the PS DL target BLER Quality reduces the downlink transmit power of PS User Equipment/Radio Access Bearer Combinations (UeRCs).

5. The method as recited in claim 1, wherein the step of reducing the DL target BLER Quality for the first subset of radio links includes reducing by the congestion controller, a circuit-switched (CS) DL target BLER Quality;

wherein reducing the CS DL target BLER Quality reduces the downlink transmit power of CS speech Radio Access Bearers (RABs).

6. The method as recited in claim 1, wherein:

the step of reducing the DL target BLER Quality for the first subset of radio links includes reducing by the congestion controller, a packet-switched (PS) DL target BLER Quality, thereby reducing the downlink transmit power of PS User Equipment/Radio Access Bearer Combinations (UeRCs); and the step of reducing the DL target BLER Quality for the second subset of radio links includes reducing by the congestion controller, a circuit-switched (CS) DL target BLER Quality, thereby reducing the downlink transmit power of CS speech Radio Access Bearers (RABs).

7. The method as recited in claim 6, further comprising the steps of:

determining by the congestion controller, whether congestion still exists in the sector when the second reduction time period expires;

upon determining that congestion still exists in the sector, selectively releasing non-guaranteed Air Interface Speech Equivalents (ASEs) and then guaranteed ASEs, if required, to resolve the congestion; and upon determining that congestion does not still exist in the sector, restoring both the PS and the CS DL target BLER Qualities to original target values.

8. A congestion controller for controlling congestion in a sector of a cellular telecommunication network having a plurality of radio links between a radio base station and User Equipments (UEs) operating in the sector, the congestion controller comprising:

a processor coupled to a non-transitory memory, wherein when the processor executes computer program instructions stored on the memory, the processor causes the congestion controller to:

detect that congestion exists in the sector when a current level of downlink transmit power being utilized in the sector exceeds a threshold level; and in response to detecting the congestion, reduce a downlink (DL) target Block Error Rate (BLER) Quality for a first subset of the plurality of radio links, wherein the congestion controller reduces the DL target BLER Quality for the first subset of the radio links for a first reduction time period;

wherein reducing the DL target BLER Quality reduces the downlink transmit power of the first subset of radio links;

determine whether congestion still exists in the sector when the first reduction time period expires; and reduce a DL target BLER Quality for a second subset of the radio links for a second reduction time period, upon determining that congestion still exists in the sector;

wherein reducing the DL target BLER Quality for the second subset reduces the downlink transmit power of the second subset of the plurality of radio links.

9. The congestion controller as recited in claim 8, wherein the congestion controller is configured to detect that congestion exists by detecting that the current level of downlink transmit power exceeds the threshold level for more than a hysteresis period of time.

10. The congestion controller as recited in claim 8, wherein the threshold level is a downlink transmit power level equal to the sum of an admission power level plus an offset power amount, wherein the admission power level is the downlink power level above which the base station will not accept new calls, and the sum of the admission power level and the offset power amount is less than the maximum downlink power available.

11. The congestion controller as recited in claim 8, wherein the congestion controller is configured to reduce a packet-switched (PS) DL target BLER Quality, thereby reducing the downlink transmit power of PS User Equipment/Radio Access Bearer Combinations (UeRCs).

12. The congestion controller as recited in claim 8, wherein the congestion controller is configured to reduce a circuit-switched (CS) DL target BLER Quality, thereby reducing the downlink transmit power of CS speech Radio Access Bearers (RABs).

13. The congestion controller as recited in claim 8, wherein:

the first subset of radio links includes circuit-switched (CS) speech Radio Access Bearers (RABs), and the congestion controller is configured to reduce a CS DL target BLER Quality, thereby reducing the downlink transmit power of the CS speech RABs; and the second subset of radio links includes packet-switched (PS) User Equipment/Radio Access Bearer Combinations (UeRCs), and the congestion controller is configured to reduce a PS DL target BLER Quality, thereby reducing the downlink transmit power of the PS UeRCs.

14. The congestion controller as recited in claim 8, wherein:

the first subset of radio links includes packet-switched (PS) User Equipment/Radio Access Bearer Combinations (UeRCs), and the congestion controller is configured to reduce a PS DL target BLER Quality, thereby reducing the downlink transmit power of the PS UeRCs; and the second subset of radio links includes circuit-switched (CS) speech Radio Access Bearers (RABs), and the congestion controller is configured to reduce a CS DL target BLER Quality, thereby reducing the downlink transmit power of the CS speech RABs.

15. The congestion controller as recited in claim 14, wherein the congestion controller is configured to:

determine whether congestion still exists in the sector when the second reduction time period expires;

upon determining that congestion still exists in the sector, selectively release non-guaranteed Air Interface Speech Equivalents (ASEs) and then guaranteed ASEs, if required, to resolve the congestion; and upon determining that congestion does not still exist in the sector, restore both the PS and the CS DL target BLER Qualities to original target values.

* * * * *